Feb. 12, 1935.  A. O. DALLER  1,990,637
METHOD OF MAKING CONTAINERS
Original Filed Dec. 30, 1932  2 Sheets-Sheet 1
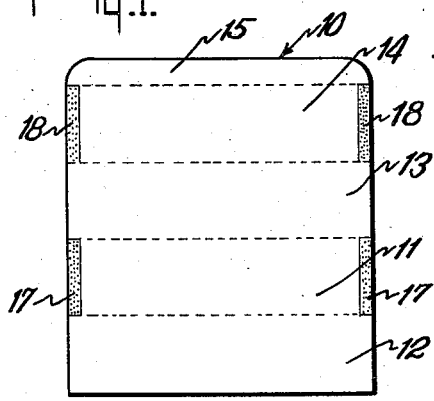
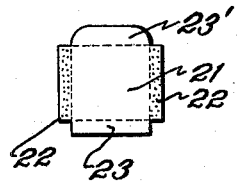
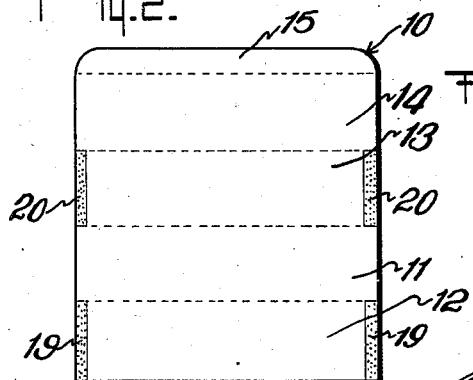
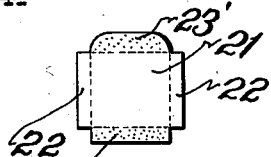
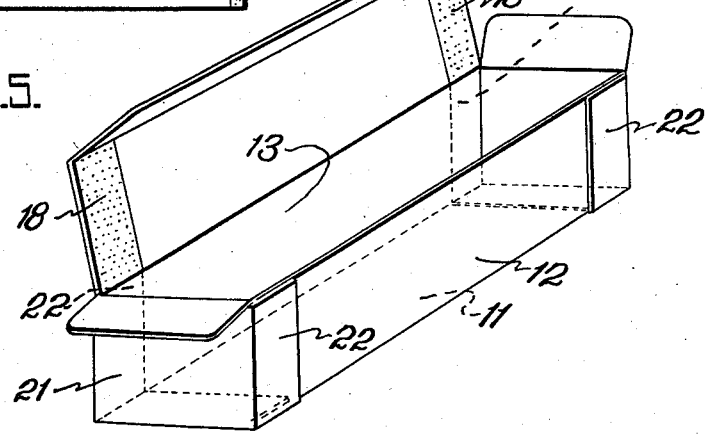
INVENTOR
Adrian O. Daller
BY Warfield & Brown
ATTORNEYS Feb. 12, 1935.  A. O. DALLER  1,990,637
METHOD OF MAKING CONTAINERS
Original Filed Dec. 30, 1932    2 Sheets-Sheet 2
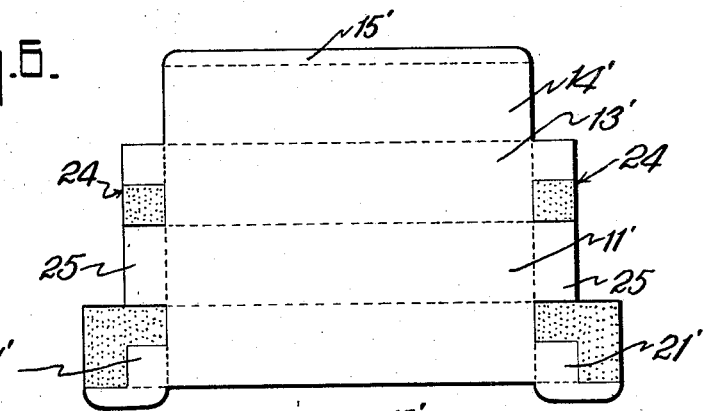
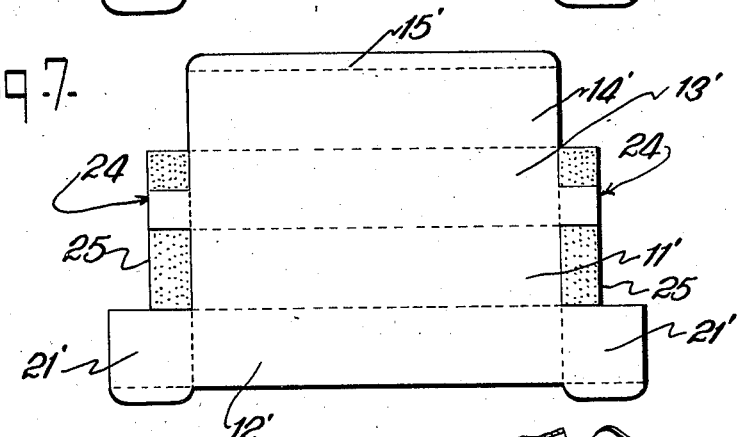
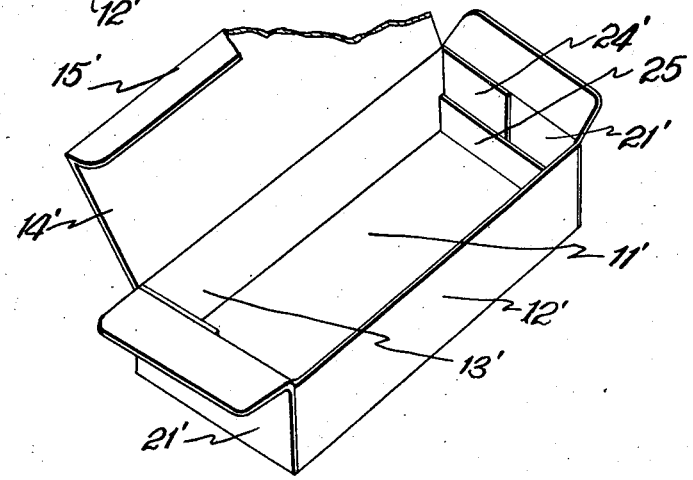
INVENTOR
Adrian O. Daller
BY
Warfield & Brown
ATTORNEYS Patented Feb. 12, 1935

1,990,637

UNITED STATES PATENT OFFICE 1,990,637

METHOD OF MAKING CONTAINERS

Adrian O. Daller, Dennisport, Mass., assignor to Daller Carton Co., Inc., New York, N. Y., a corporation of New York Original application December 30, 1932, Serial No. 649,502. Divided and this application June 2, 1933, Serial No. 674,029

13 Claims. (Cl. 93—36)

This invention relates to a method of making containers and, more specifically, a method of making tight-seal containers.

This application is a division of my co-pending application Serial No. 649,502, filed December 30, 1932.

In general, it is an object of the invention to provide a method of the character described, which will produce an improved product, which will permit of the use of improved materials, which will increase the speed of production and which is simply and economically practical.

Another object of the invention is to provide a method of making containers wherein it is not necessary to dry out adhering surfaces once they are juxtaposed and not necessary to apply heat when adhering surfaces are first pressed together.

Another object is to provide a method of adhesively constructing containers whereby a relatively large number may be passed through the building apparatus per unit time.

Another object is to provide a method of adhesively making containers of parts which are coated with material which normally hinders the use of an adhesive.

Another object is to provide a method of constructing containers, which permits the parts to be stored and thereafter to be joined without the addition of adhesive or the addition of a solvent to previously-applied adhesive.

Another object is to provide a method of constructing articles whereby parts prepared with adhesive may be stored in stacks without those parts adhering to each other.

Other objects of the invention will in part be obvious and will in part appear hereinafter.

The invention accordingly comprises the several steps and relation and order of one or more of such steps with respect to each of the others thereof, which will be exemplified in the method hereinafter disclosed, and the scope of the application of which will be indicated in the claims.

For a fuller understanding of the nature and objects of the invention, reference should be had to the following detailed description taken in connection with the accompanying drawings, in which:

Figure 1 is a plan view of one form of blank to be used in connection with a method of forming a carton which embodies the invention;

Fig. 2 is a plan view of the blank shown in Fig. 1 and seen from below, the exposed surface being on the exterior of the later-formed carton;

Fig. 3 is a view similar to Fig. 1 of another blank adapted to be used in connection with the blank in Fig. 1;

Fig. 4 is a plan view of the reverse side of the blank shown in Fig. 3;

Fig. 5 is a perspective view of a carton constructed from the blanks shown in Figs. 1 and 3;

Fig. 6 is a plan view of a blank embodying another exemplification of the invention and from which, and without additional elements, a carton may be formed;

Fig. 7 is a reverse view of the blank shown in Fig. 6; and

Fig. 8 is a perspective view of a carton constructed from the blank shown in Figs. 6 and 7.

In the embodiment of the invention shown in the drawings and particularly in Figs. 1–5, 10 denotes a blank comprising a base section or element 11 with side sections 12 and 13, one on each side of said base section. A top section 14 extends beyond one of the side sections and there may be a flap 15 attached to the top section. Portions of the ends of these sections may have adhesive applied. These portions may be so arranged, on both sides of the blanks, that the projection of any one portion through the blank does not fall on another adhesive portion. Preferably the portions 17 on the bottom section of the interior of the blank (that face which is to become the interior of the final article) and the portions 18 on the top sections of the interior of the blank, have an applied adhesive (see Fig. 1). Similarly, the portions 19 on end of the front side section of the exterior of the blank and the portions 20 on the end of the back side section of the exterior of the blank have an applied adhesive (see Fig. 2).

This adhesive is preferably one which may be applied moist to a surface and which will remain attached to that surface after the moisture has been removed, but which thereafter will only adhere to other similar adhesive and not to another bare surface. With the portions arranged as above, it is possible to dry the adhesive after it is applied and then to stack a plurality of the blanks without their adhering to each other, there being no adhesive areas in contact between one side of one blank and the juxtaposed opposite face of the next blank. 21 denotes another section, e. g., an end section having adhesive portions similarly arranged but also arranged so that the portions may be in contact with other adhesive portions on other parts of the completed article, shown here as a container. There may be side tabs 22 attached to or integral with the end sections 21. The interior surface of these tabs may have adhesive applied (see Fig. 3), and may be adapted to be superimposed on the exterior of the adhesive portions 19 and 20 of the sections 12 and 14. A bottom tab 23 may have adhesive on the exterior (see Fig. 4) and be adapted to be superimposed on the interior of the adhesive portion 17 of the section 11. A top tab 23' may be similarly treated and be adapted to lie under adhesive portion 18 of the section 14. Before assembling the entire article these blanks also may be stacked.

The article or carton is assembled by folding the blanks so as to leave the indicated sections. There may be indicia indicating the folding lines. The end sections are attached by superposing the parts as described above. The process is exceedingly rapid as there is no need to wait for the adhesive to dry. Once the adhesive areas are contacted under pressure, they remain intersecured. Nor is there any need to apply heat with the pressure. All heat of evaporation or heat exchange may be completed before the pressure is applied. It is, however, possible, of course, to attach the faces while the adhesive is still moist.

An adhesive having the properties described may contain a latex or gum such as the dispersion of rubber in a rubber latex. Other materials may, if desired, be mixed with the latex. For example, casein may be added to improve the action of the adhesive. Ammonium hydroxide may be incorporated in the adhesive to render it sufficiently alkaline to hold and keep the latex and casein in solution. Such a mixture may be diluted with water to the proper consistency for use. If increased tackiness is desired sodium hypochloride in suitable quantities may be added to the mixture. Finally a suitable deodorant such as methyl-salicylate and any suitable germicide may be added, if desired. Such a product forms an excellent adhesive, particularly where the carton to which it is applied is used in connection with the packaging of foodstuffs. It is to be understood, however, that the invention is not to be limited to the use of a particular adhesive such as that described above. For example, pure rubber latex may be employed under certain circumstances and other gums and/or latexes may be used.

Adhesives such as those described have been found adapted to adhere directly to smooth surfaces which may even have been coated with wax, paraffin, or other moisture-vapor-proof materials. The surface thus obtained may be called "wax-like." Adhesives such as have been described are also adapted for use in connection with shellacked or varnished surfaces as well as with plain uncoated carton board. Heretofore it has been necessary when an adhesive has been used with a waxed surface, for example, to combine the adhesive with a solvent for the wax, so that the adhesive may penetrate and grip the surface beneath the wax coating. Such a process has been found tedious, expensive and laborious. Cartons so treated cannot be packaged and sealed rapidly. The adhesive herein described as a preferred adhesive simplifies the use of coated board in carton manufacture and makes possible a tight seal when such board is used without using added solvents for the coating.

Figs. 6 and 7 show the two sides of a blank used to build the article shown in Fig. 8, which is a modification of the article shown in Fig. 5. In this case there need be but a single blank. These end sections are integral with the other sections. 11', 12', 13', 14' and 15' denote bottom, front side, back side, top and flap sections respectively. At both ends of one or at one end of each of the side sections 12' and 13', are end sections 21'. These may have an area similar in design to the end of the article to be fabricated. There may be flaps 24 on the ends of the other side section or sections, and flaps 25 on the end of the bottom section. There may be adhesive on the outside of the bottom flaps 25. In forming the container any convenient folding order may be followed. The flaps 25 may be turned up first, the side flaps 24 next and overlying the former, and the end sections 21' folded around last. Adhesive may be used between any two contacting faces and on such areas that there is a tight seal over the entire end of the box. For example, the lower inside surface and the upper outside of the side flaps may have adhesive applied. The inside surface of the end sections 21' may also have adhesive. With such an arrangement a plurality of these blanks may be stacked without the adhesive on one blank contacting with that on the next. If desired, the entire exterior of the flaps 24 may be covered with adhesive.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A method of attaching coated surfaces, at least one of said surfaces having a wax-like coating, comprising connecting said surfaces with an adhesive containing rubber latex, there being no heat exchange during or after said connecting.

2. A method of attaching coated surfaces, at least one of said surfaces having a wax-like coating, comprising applying an adhesive containing rubber latex to said surfaces and pressing said surfaces together, and ending any heat exchange when said pressing begins.

3. A method of attaching smooth coated surfaces, at least one of said surfaces having a wax-like coating, comprising applying a fluid adhesive containing rubber latex to said surfaces and pressing said surfaces together, and ending any heat exchange when said pressing begins.

4. A method of attaching surfaces having a wax-like coating, comprising applying an adhesive containing rubber latex and water to said surfaces, drying said surfaces, and pressing said surfaces together.

5. A method of attaching coated surfaces, at least one of said surfaces having a wax-like coating, comprising applying a fluid adhesive containing a rubber dispersion to said surfaces, causing said adhesive to lose its fluidity and pressing said surfaces together.

6. The method comprising coating a plurality of surfaces, at least one of said surfaces being given a coating having wax-like properties, and connecting said surfaces with an adhesive containing rubber latex.

7. The method comprising coating a plurality of surfaces, at least one of said surfaces being given a coating having wax-like properties, applying an adhesive containing rubber latex to said surfaces, and pressing said surfaces together.

8. The method comprising coating a plurality of surfaces with a waxy substance, applying an adhesive containing a substance which will cause said surfaces to adhere under pressure when dry, drying said surfaces and pressing said surfaces together.

9. The method comprising coating a plurality of surfaces, at least one of said surfaces being given a coating having wax-like properties, applying an adhesive containing a rubber dispersion to said surfaces, drying said surfaces, and pressing said surfaces together.

10. A method of making containers of a material having a wax-like surface, comprising surfacing certain parts of certain elements of said containers with an adhesive having rubber latex as a constituent, and pressing certain of said parts against certain others of said parts.

11. A method of making containers of a material having a wax-like surface, comprising surfacing certain parts of certain elements of said containers with an adhesive having rubber latex as a constituent, drying said parts and pressing certain of said parts against certain others of said parts.

12. In the formation of a device, comprising bottom, top and side sections, said sections having a wax-like surface, an end section at the end of and integral with one of said side sections and having an area at least as large as the end of said device, a folding tab extending from the end of the other of said side sections, a folding tab extending from the end of said bottom section, said end section and tabs being superimposed and an adhesive on the contacting faces thereof and having rubber latex as a constituent, the process comprising applying said adhesive to said faces, drying said adhesive, and pressing said faces together.

13. In the formation of a device comprising bottom, top and side sections, said sections having a wax-like surface, an end section at the end of and integral with one of said side sections and having an area at least as large as the end of said device, a folding tab extending from the end of one of said side sections, a folding tab extending from the end of said bottom section, said end section and tabs being superimposed, and an adhesive on the contacting faces thereof and having rubber latex as a constituent, there being no adhesive on both sides of any given area of any given section or tab, the process comprising applying said adhesive to said faces, drying said adhesive, and pressing said faces together.

ADRIAN O. DALLER.